United States Patent Office 3,343,967
Patented Sept. 26, 1967

3,343,967
STABILIZER COMPOSITIONS
Irving H. Rubenstein, Staten Island, N.Y., assignor to Harwood Specialties Corporation
No Drawing. Filed Apr. 28, 1964, Ser. No. 363,277
11 Claims. (Cl. 99—136)

ABSTRACT OF THE DISCLOSURE

A fat-free stabilizer composition for use in making water ices is provided. It is made up of 30% soya albumin, 20% propylene glycol alginate, 20% guar gum and either 30% sugar or 10% sugar and 20% glyceryl monostearate. The composition (0.5%) is combined with sugar, corn syrup solids and water for producing water ices.

---

The present invention relates to stabilizer compositions for use in the production of water ices and to a method of continuously producing such water ices and filling the same in predetermined like quantities into a succession of containers. The stabilizer compositions are based upon the blending of soya albumin as a basic protein whipping agent with vegetable gums to form stabilizer compositions of suitable body and texture. The stabilizer compositions are also characterized by the fact that they are fat free.

The production of water ices in a continuous type ice cream freezer has presented a problem to the ice cream industry for a great many years. It has been customary to use a stabilizer containing ingredients such as gum karaya, guar gum, locust bean gum, pectins, alginates, gelatins and carboxymethylcellulose as well as other materials but these have never been successful in producing a product in which the overrun, that is, the increase in volume during freezing, can reach 100%. Another difficulty which has been encountered has been the inability to produce a continuous flow out of the ice cream freezer. This is due to lack of uniformity with regard to air cells incorporated into the frozen mix. Consequently, the frozen water ice discharges from the freezer in periodic, irregular bursts between the elimination of small air masses. Such a discontinuous or erratic flow makes it impossible to connect the outlet of the freezer making the water ices directly to a fixed speed packaging machine since the irregular or erratic discharge causes some containers to be over-filled and other containers to be under-filled.

It has long been a trade practice to add egg whites to water ices in order to assist the whip. While this has some small advantage it has serious disadvantages. It was necessary to use fresh or frozen egg whites and they had to be added directly at the freezer. When the water ice base was pasteurized the egg whites would coagulate. In order to get reasonably desirable overrun control it was necessary to add as much as 15% of the egg whites. In order to try to overcome these dicuities some attempts have been made to use dried egg whites. This has not been successful. The egg whites were insoluble and had to be soaked overnight in order to prepare a usable solution. This relatively long time period necessary to make such a usable solution unfortunately resulted in a very marked increase in bacteria counts which made the finished product unacceptable to most health authorities.

It is also known to use soya albumin as a whipping aid in fat-based products. The nature of such a fat whip is distinctively different from the protein whip of the present invention. This is evidenced by the age-old household technique of beating egg whites and egg yolks separately and then combining the two after the whip is completed. When soya albumins are added to a fat-based product the nature of the air cell structure is completely different and for a very different purpose than the present invention.

In accordance with the present invention stabilizer compositions have been formulated using soya proteins as the basic whipping agent combined with vegetable gums to produce desirable body and texture. The components used in the present compositions are those which aid the distinctive protein whip of the soya albumins. It is extremely important and imperative in making proper use of the new stabilizer compositions of the present invention that no fat or free fat be permitted to be present under any circumstances. It is even necessary for practical commercial operation that no fat-containing products be present in the pipelines or freezing equipment prior to making the protein whipped frozen ices. The presence of fat-containing products in the pipelines or freezing equipment interferes with the practical and commercial application of the present invention and if such are present as, for example, if the equipment has just previously been used for making ice cream, the fats or fat-containing products must be removed or eliminated.

A basic stabilizer composition according to the present invention has the following approximate formulation:

| | Percent |
|---|---|
| Soya albumin | 30 |
| Propylene glycol alginate | 20 |
| Guar gum | 20 |
| Sugar | 30 |

The foregoing ingredients are thoroughly blended and then 0.5% of the basic stabilizer composition is combined with 20% of sugar, 10% of corn syrup solids and 69.5% of water.

This formulation has the very important advantage that all the ingredient are soluble in cold water and can be made into a homogeneous mix in a very few minutes. It is understood that suitable flavors in desired amounts can be added and where desired a small amount of citric acid can also be added. The resulting product is then immediately frozen to any desired overrun and with a continuous flow in the water ice-making equipment.

It is recognized that the use of sugar and water mixes in ice cream freezers can, under some circumstances, damage the equipment since the machinery was designed for use with a fat-containing ice cream mix which is its own lubricant due to the presence of the fat. Where such needs to be taken into account, the above basic stabilizer composition can be modified so as to provide proper lubrication for the ice cream freezer and under such conditions a modified stabilizer composition is used containing the following ingredients in approximately the following amounts:

| | Percent |
|---|---|
| Soya albumin | 30 |
| Guar gum | 20 |
| Propylene glycol alginate | 20 |
| Glyceryl monostearate | 20 |
| Sugar | 10 |

This modified stabilizer composition is added in the same percentage, i.e. 0.5%, as in the previous example which contains no glyceryl monostearate and is used in the same way except that the glyceryl monostearate is dissolved in hot water but after the mixture is cooled it is then used exactly as described above with reference to the stabilizer composition lacking the glyceryl monostearate. While glyceryl monostearate is a derivative of a vegetable fat, it is known to be an excellent emulsifying agent and unlike fats is readily compatible with an aqueous system. At the same time, it is a distinct aid in providing lubrication for the freezer where such is necessary or desirable. The lubricating action is easily evident to any experienced operator who can tell by the sound of the freezer when it is working with water ice mixes because there is a grinding, abrasive action, but when the glyceryl monostearate is the only additive the sound of the freezer is approximately the same as when ice cream is being frozen.

In the foregoing examples of stabilizer compositions, propylene glycol alginate and guar gum have been used in conjunction with soya protein. These provide the best product with the most desirable eating quality and the designated gums are superior to alternate formulations with other vegetable gums. It is to be understood, however, that the invention is not restricted to the use of only propylene glycol alginate and guar gum in combination with the soya protein since other vegetable gums can be employed satisfactorily. It is also to be understood that the invention is not limited to the preferred use of 20% of sugar and 10% of corn syrup solids as the total amount of these two ingredients may be considerably varied depending on how soon the water ice is to be used and at what temperature it is stored. For example, the water ice is often sold as a slush in which event the total quantity of sugar and corn syrup solids is 18% or somewhat less and storage is at +10° F. In the case of a hard frozen water ice the sugar and corn syrup solids may be kept about equally low and storage is at 0° F. The amount of water is adjusted accordingly. The total amount of sugar and corn syrup solids can also exceed 30%, if desired, depending on consistency and taste characteristics desired and storage and vending time and conditions. The ratio of sugar to corn syrup solids need not necessarily be 2:1 as in the preferred water ice formulation set forth above. The general range of total sugar and corn syrup solids can be rather wide as from about 10% to about 35% and within that range the ratio of sugar to corn syrup solids can vary appreciably.

What is claimed is:

1. A fat-free stabilizer composition comprising soya albumin, propylene glycol alginate, guar gum and sugar.

2. A fat-free stabilizer composition comprising approximately 30% of soya albumin, approximately 20% of propylene glycol alginate, approximately 20% of guar gum and approximately 30% of sugar.

3. A fat-free stabilizer composition comprising approximately 30% of soya albumin, approximately 20% of propylene glycol alginate, approximately 20% of guar gum, approximately 10% of sugar and approximately 20% of glyceryl monostearate.

4. A composition for use in the continuous production of water ices which consists essentially of 0.5% of a stabilizer composition of claim 2 combined with approximately 20% of sugar, 10% of corn syrup solids and 69.5% of water.

5. A composition for use in the continuous production of water ices which consists essentially of 0.5% of a stabilizer composition of claim 2 combined with approximately a total of 10% to 35% of sugar and corn syrup solids and the balance water.

6. A composition for use in the continuous production of water ices which consists essentially of 0.5% of a stabilizer composition of claim 2 combined with approximately a total of 18% of sugar and corn syrup solids and the balance water.

7. In a method for continuously producing water ices and filling the same in predetermined like quantities into a succession of containers the steps which comprise blending about 30% of soya albumin as a basic protein whipping agent and 10 to 30% sugar with sufficient guar gum and propylene glycol alginate to form a stabilizer composition of suitable body and texture and incorporating about 0.5% of said stabilizer composition with about 69.5% of water, about 20% of sugar and about 10% of corn syrup solids.

8. In a method for continuously producing water ices and filling the same in predetermined like quantities into a succession of containers the steps which comprise blending about 30% of soya albumin as a basic protein whipping agent with approximately 20% of propylene glycol alginate, approximately 20% of guar gum and approximately 30% of sugar to form a stabilizer composition of suitable body and texture and incorporating about 0.5% of said stabilizer composition with about 69.5% of water, about 20% of sugar and about 10% of corn syrup solids.

9. In a method for continuously producing water ices and filling the same in predetermined like quantities into a succession of containers the steps which comprise blending about 30% of soya albumin as a basic protein whipping agent with approximately 20% of propylene glycol alginate, approximately 20% of guar gum, approximately 10% of sugar and approximately 20% of glyceryl monostearate to form a stabilizer composition of suitable body and texture and incorporating about 0.5% of said stabilizer composition with about 69.5% of water, about 20% of sugar and about 10% of corn syrup solids.

10. In a method for continuously producing water ices and filling the same in predetermined like quantities into a succession of containers the steps which comprise blending about 30% of soya albumin as a basic protein whipping agent with approximately 20% of propylene glycol alginate, approximately 20% of guar gum and approximately 30% of sugar to form a stabilizer composition of suitable body and texture and incorporating about 0.5% of said stabilizer composition with about 10% to 35% of sugar and corn syrup solids and the balance water.

11. In a method for continuously producing water ices and filling the same in predetermined like quantities into a succession of containers the steps which comprise blending about 30% of soya albumin as a basic protein whipping agent with approximately 20% of propylene glycol alginate, approximately 20% of guar gum and approximately 30% of sugar to form a stabilizer composition of suitable body and texture and incorporating about 0.5% of said stabilizer composition with about 18% of sugar and corn syrup solids and the balance water.

References Cited

UNITED STATES PATENTS 2,846,314   8/1958   Aichele et al. _____ 99—17

FOREIGN PATENTS 915,389   1/1963   England.

OTHER REFERENCES

Alikonis, J.: Food Engineering, "Those New Soy Proteins," vol. 31, No. 4, April 1959, pp. 104–105.

Bennett, Substitutes Chemical Pub. Co., Brooklyn, N.Y., p. 108, 1943.

Whistler et al. eds., Industrial Gums, Academic Press, New York, pp. 65 and 328, 1959.

A. LOUIS MONACELL, *Primary Examiner.*

J. M. HUNTER, *Assistant Examiner.*